(12) United States Patent
Baek

(10) Patent No.: US 12,375,631 B2
(45) Date of Patent: Jul. 29, 2025

(54) VEHICLE AND METHOD OF CONTROLLING THE SAME

(71) Applicants: Hyundai Motor Company, Seoul (KR); Kia Corporation, Seoul (KR)

(72) Inventor: Jooam Baek, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 108 days.

(21) Appl. No.: 18/073,019

(22) Filed: Dec. 1, 2022

(65) Prior Publication Data

US 2023/0179745 A1 Jun. 8, 2023

(30) Foreign Application Priority Data

Dec. 3, 2021 (KR) .................. 10-2021-0172198

(51) Int. Cl.
*H04N 7/18* (2006.01)
*B60N 2/00* (2006.01)
*G06T 7/292* (2017.01)
*H04N 23/60* (2023.01)
*H04N 23/698* (2023.01)
*H04N 23/90* (2023.01)
*B60R 11/00* (2006.01)
*B60R 11/04* (2006.01)

(52) U.S. Cl.
CPC ........... *H04N 7/188* (2013.01); *B60N 2/0024* (2023.08); *G06T 7/292* (2017.01); *H04N 7/181* (2013.01); *H04N 23/64* (2023.01); *H04N 23/698* (2023.01); *H04N 23/90* (2023.01); *B60N 2210/24* (2023.08); *B60N 2230/30* (2023.08); *B60R 2011/0003* (2013.01); *B60R 2011/004* (2013.01); *B60R 11/04* (2013.01); *G06T 2207/30261* (2013.01)

(58) Field of Classification Search
CPC ............................... H04N 7/188; G06T 7/292
See application file for complete search history.

(56) References Cited

U.S. PATENT DOCUMENTS 6,328,126 B2 * 12/2001 Breed ................. G01F 23/2962
180/274
6,561,301 B1 * 5/2003 Hattori ............. B60R 21/01332
180/274

(Continued)

FOREIGN PATENT DOCUMENTS

TW 201601921 A * 1/2016
TW 2010921 * 3/2016
WO WO2018012555 A1 * 1/2018

*Primary Examiner* — Irfan Habib
(74) *Attorney, Agent, or Firm* — Morgan, Lewis & Bockius LLP

(57) ABSTRACT

A vehicle includes an internal camera configured to obtain first image data; an external camera configured to obtain second image data; an impact detecting sensor configured to detect an external impact and generate an impact detection signal; a memory configured to store the first image data and the second image data; and a processor electrically connected to the impact detecting sensor and configured to generate an impact event when a strength of the impact detection signal exceeds a threshold, and in response to the impact event being generated, control the memory to store the first image data and the second image data in the memory.

14 Claims, 8 Drawing Sheets

(56) References Cited

U.S. PATENT DOCUMENTS

| | | | | |
|---|---|---|---|---|
| 6,929,282 | B1* | 8/2005 | Zoratti | B60R 21/33 |
| | | | | 180/274 |
| 7,098,778 | B1* | 8/2006 | Zoratti | B60R 21/013 |
| | | | | 340/436 |
| 9,019,090 | B2* | 4/2015 | Weller | B60R 1/02 |
| | | | | 340/425.5 |
| 9,373,202 | B2* | 6/2016 | Shimizu | G07C 5/085 |
| 9,539,970 | B2* | 1/2017 | Kim | B60R 21/017 |
| 11,066,068 | B2* | 7/2021 | Kwon | B60W 30/06 |
| 11,837,069 | B2* | 12/2023 | Kim | G08B 21/182 |
| 2007/0251294 | A1* | 11/2007 | Tanaka | G01P 15/0922 |
| | | | | 73/12.01 |
| 2009/0210114 | A1* | 8/2009 | Baumann | B60T 7/12 |
| | | | | 701/45 |
| 2009/0273672 | A1* | 11/2009 | Koudritski | B60R 25/305 |
| | | | | 348/148 |
| 2014/0195070 | A1* | 7/2014 | Shimizu | B60W 30/095 |
| | | | | 701/1 |
| 2018/0082441 | A1* | 3/2018 | Kim | H04N 23/687 |
| 2018/0103252 | A1* | 4/2018 | Hsieh | H04N 19/176 |
| 2022/0289251 | A1* | 9/2022 | Goto | B60W 60/0013 |
| 2023/0031034 | A1* | 2/2023 | Nagata | G06T 3/40 |

\* cited by examiner

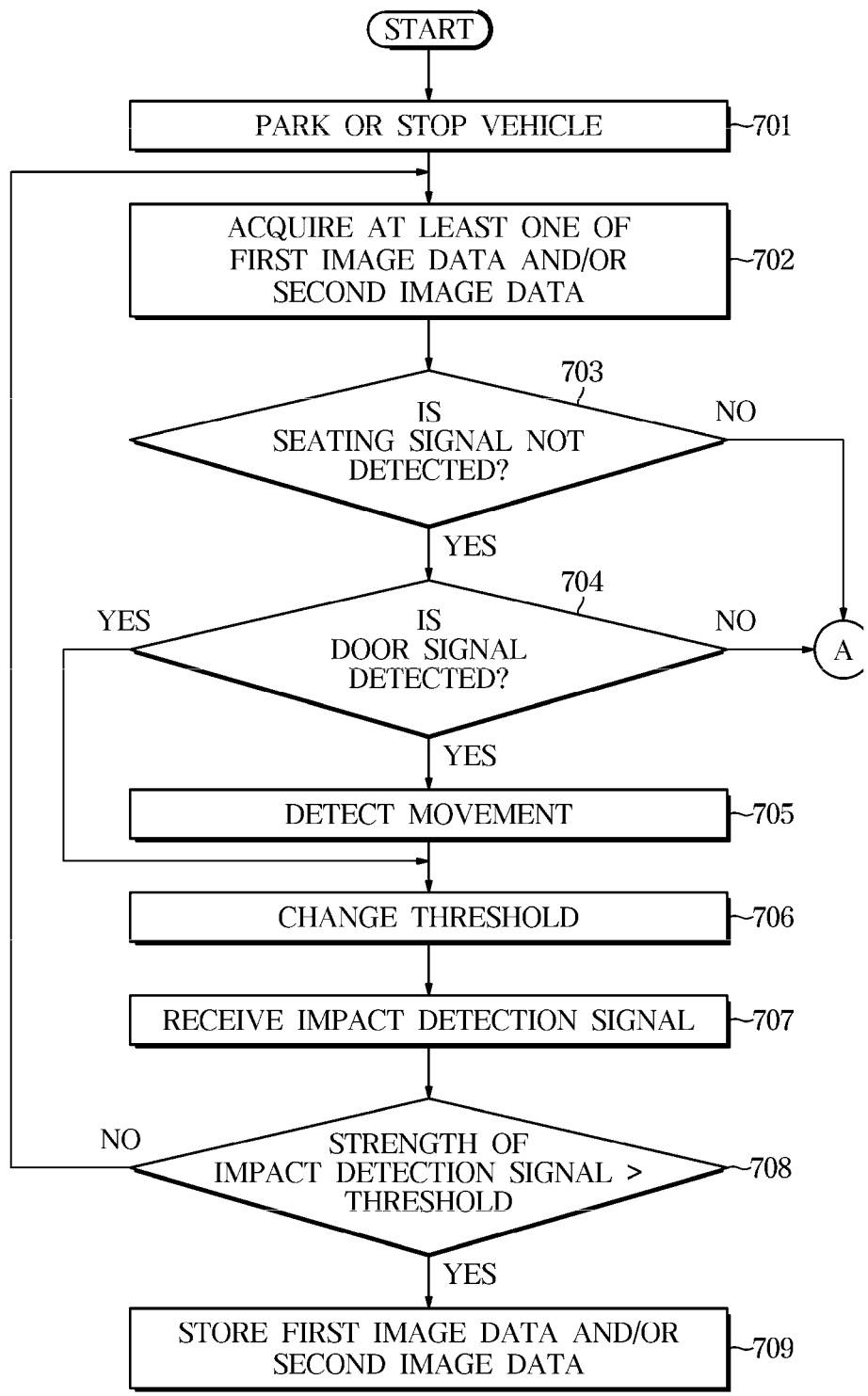

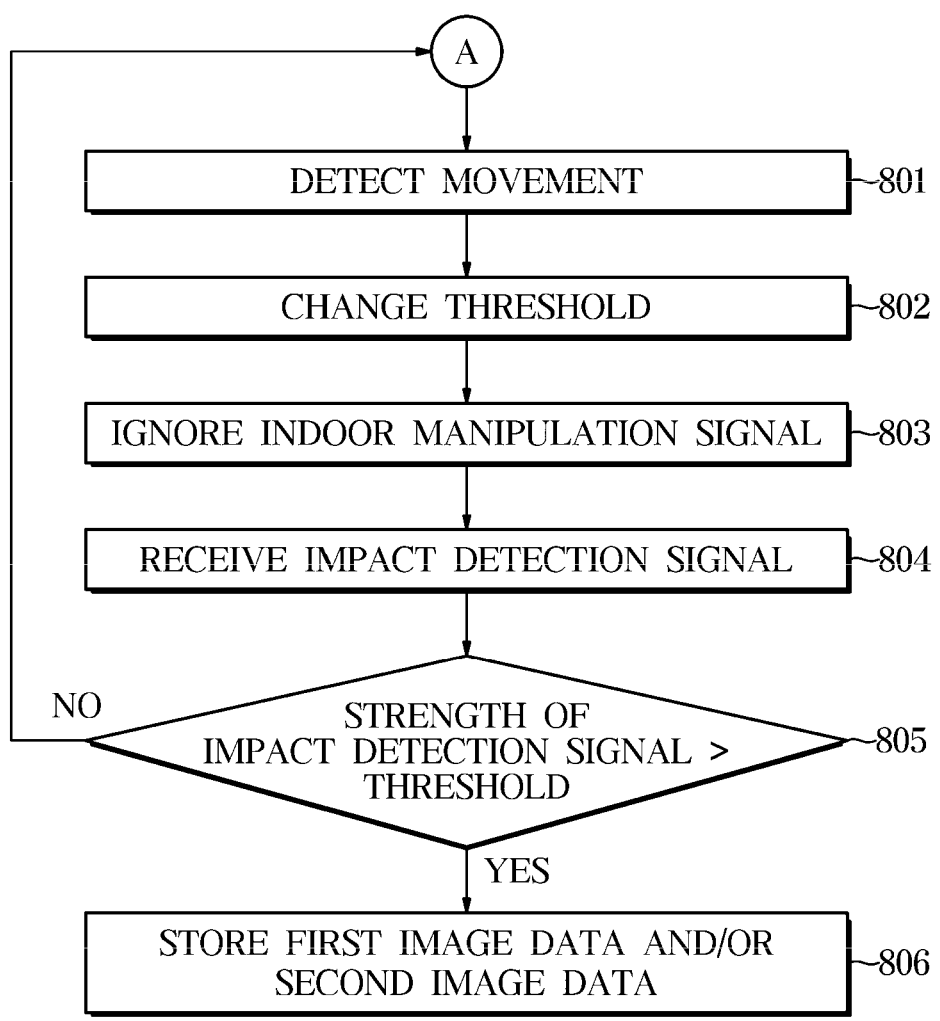

VEHICLE AND METHOD OF CONTROLLING THE SAME

CROSS-REFERENCE TO RELATED APPLICATION

The present application claims priority to Korean Patent Application No. 10-2021-0172198, filed on Dec. 3, 2021, the entire contents of which is incorporated herein for all purposes by this reference.

BACKGROUND OF THE PRESENT DISCLOSURE

Field of the Present Disclosure

The present disclosure relates to a vehicle and a method of controlling the same, and more specifically, to a vehicle for detecting an external impact when parked (or stopped) and a method of controlling the same.

Description of Related Art

The so-called door-ding refers to damage due to an impact applied, by a door edge portion of a vehicle when the driver of a vehicle opens the door to alight in a narrow parking/stop area, to a door surface of the next vehicle.

As a method of detecting a door-ding, there is a method of attaching a door guard to a vehicle, but from the point of view of the consumer, separate cost is incurred and the aesthetics is impaired.

On the other hand, considering that vehicles are provided with infrastructure elements, such as various cameras and sensors, there is a demand for a method to solve the above limitations without adding a separate hardware configuration.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle and a method of controlling the same that are configured for accurately detecting an external impact when parked or stopped, and promptly providing a user with information related to the external impact.

The technical objectives of the present disclosure are not limited to the above, and other objectives may become apparent to those of ordinary skill in the art based on the following descriptions.

According to an aspect of the present disclosure, there is provided a vehicle including: an internal camera configured to obtain first image data; an external camera configured to obtain second image data; an impact detecting sensor configured to detect an external impact and generate an impact detection signal; a memory configured to store the first image data and the second image data; and a processor electrically connected to the impact detecting sensor and configured to generate an impact event when a strength of the impact detection signal exceeds a threshold, and in response to the impact event being generated, control the memory to store the first image data and the second image data in the memory.

The vehicle may further include: a seating sensor provided on a seat of the vehicle, and configured to detect whether a passenger sits on the seat and generate a seating signal; and a door sensor configured to detect whether a door of the vehicle is closed to generate a door signal, wherein the processor electrically connected to the seating sensor and the door sensor is configured to, in response to the seating signal not being detected and the door signal being detected, lower the threshold.

The processor may be configured to process at least one of the first image data or the second image data to detect a movement occurring outside the vehicle, and in response to the movement being detected, lower the threshold.

The processor may be configured to, only in response to the door signal being detected, process the at least one of the first image data or the second image data.

The vehicle may further include a communicator configured to transmit and receive data to or from an external server or an external terminal, wherein the processor may be configured to, in response to the strength of the impact detection signal exceeding the threshold, control the communicator to transmit the first image data and the second image data to the external server or the external terminal.

The processor may be configured to control the communicator to transmit the impact event based on the changed threshold to the external terminal.

The processor may be configured to store the first image data and the second image data during a predetermined time interval from a point in time before the generation of the impact event to a point in time after the generation of the impact event.

The internal camera may be provided inside the vehicle and include a built-in cam for imaging a front view and a rear view for the vehicle.

The external camera may be provided outside the vehicle and configured to generate a surround view monitoring (SVM) image for imaging a front view, a rear view, and a side view for the vehicle.

The processor may be electrically connected to the internal camera and the external camera, and configured to provide the internal camera and the external camera with a control signal while the vehicle is stopped or parked.

According to another aspect of the present disclosure, there is provided a method of controlling a vehicle, the method including: obtaining first image data; obtaining second image data; detecting an external impact and generating an impact detection signal; and when a strength of the impact detection signal exceeds a threshold, generating an impact event, and in response to the impact event being generated, controlling a memory to store the first image data and the second image data in the memory.

The vehicle may include: a seating sensor provided on a seat of the vehicle, and configured to detect whether a passenger sits on the seat and generate a seating signal; and a door sensor configured to detect whether a door of the vehicle is closed to generate a door signal, wherein the method may further include, in response to the seating signal not being detected and the door signal being detected, lowering the threshold.

The lowering of the threshold may include: processing at least one of the first image data or the second image data to detect a movement occurring outside the vehicle, and in response to the movement being detected, lowering the threshold.

The method may further include, only in response to the door signal being detected, processing the at least one of the first image data or the second image data.

The method may further include: transmitting and receiving data to or from an external server or an external terminal through a communicator, and in response to the strength of the impact detection signal exceeding the threshold, controlling the communicator to transmit the first image data and the second image data to the external server or the external terminal.

The method may further include controlling the communicator to transmit the impact event based on the changed threshold to the external terminal.

The controlling of the memory to store the first image data and the second image data in the memory may include storing the first image data and the second image data during a predetermined time interval from a point in time before the generation of the impact event to a point in time after the generation of the impact event.

The internal camera may be provided inside the vehicle and includes a built-in cam for imaging a front view and a rear view for the vehicle.

The external camera may be provided outside the vehicle and configured to generate a surround view monitoring (SVM) image for imaging a front view, a rear view, and a side view for the vehicle.

The internal camera and the external camera may be electrically connected to a processor for controlling the memory, wherein the method may further include providing the internal camera and the external camera with a control signal while the vehicle is stopped or parked.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 7 is a flowchart showing a method of controlling a vehicle during parking according to an exemplary embodiment of the present disclosure; and FIG. 8 is a flowchart showing a method of controlling a vehicle according to an additional embodiment from FIG. 7.

Figure 1:
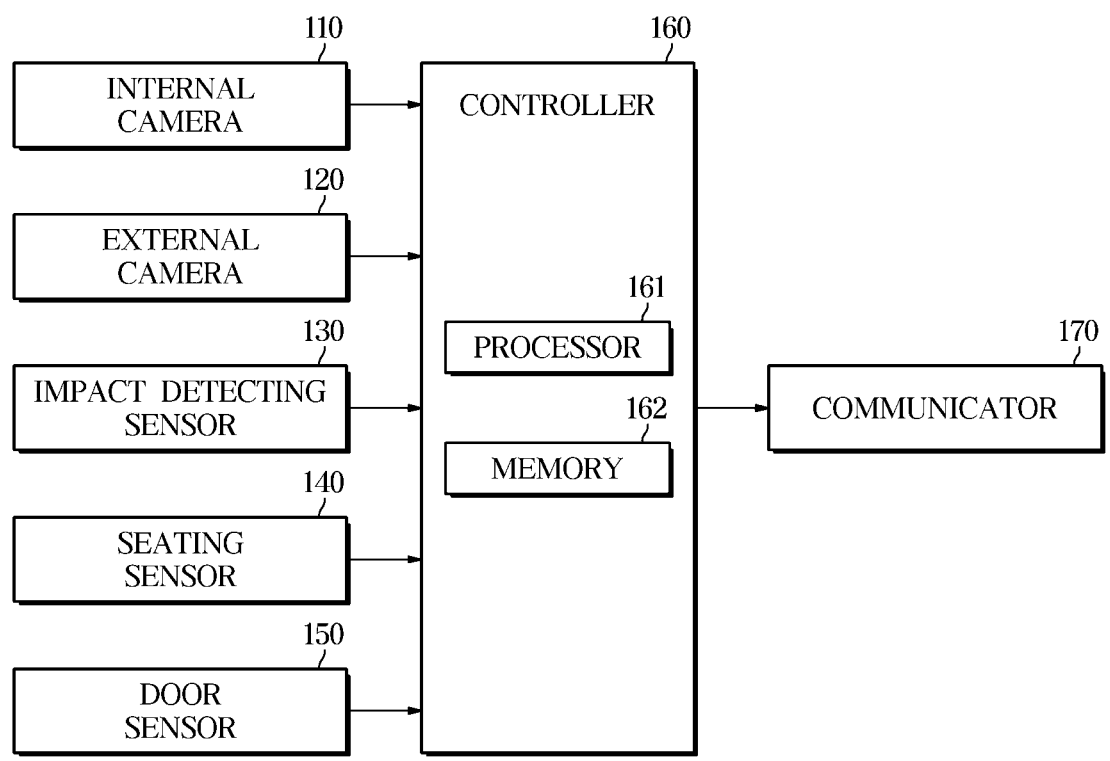
FIG. 1 is a control block diagram illustrating a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like numerals refer to like elements throughout the specification. Not all elements of embodiments of the present disclosure will be described, and description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in the present specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it may be directly on/under the other member, or one or more intervening members may also be present.

The terms including ordinal numbers like "first" and "second" may be used to explain various components, but the components are not limited by the terms. The terms are only for distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

Figure 2:
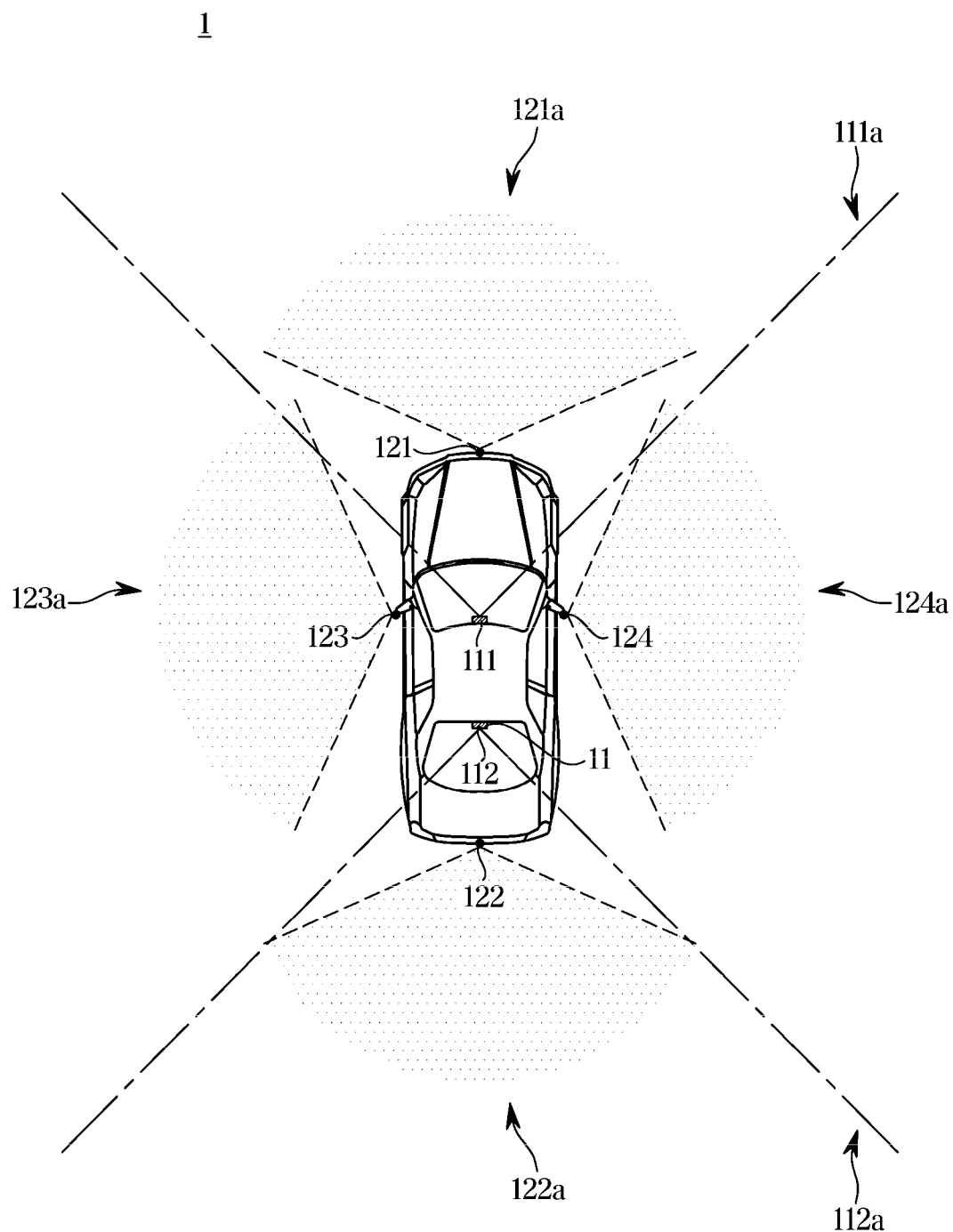
FIG. 2 is a diagram illustrating fields of view of an internal camera and an external camera included in a vehicle according to an exemplary embodiment of the present disclosure.

FIG. 1 is a control block diagram illustrating a vehicle 1 according to an exemplary embodiment of the present disclosure, and FIG. 2 is a diagram illustrating fields of view of an internal camera and an external camera included in the vehicle 1 according to the embodiment.

The vehicle 1 includes an internal camera 110 provided inside the vehicle 1, an external camera 120 provided outside the vehicle 1, an impact detecting sensor 130 for detecting impacts occurring inside and outside, a seating sensor 140 for detecting whether a driver or a passenger sits on a seat, and a door sensor 150 for detecting whether a door is opened or closed, and a controller 160 includes a processor 161 for controlling a memory 161 and a communicator 170.

The internal camera 110 includes an internal front camera 111 including a front field of view 111a of the vehicle 1 and an internal rear camera 112 including a rear field of view 112a of the vehicle 1. The internal camera 110 is a type of black box, and provided as a built-in cam located on a rear side of a rearview mirror and corresponds to a driver video record system (DVRS). The present disclosure may use the internal camera 110, which is already provided in the vehicle 1, for detecting an external impact, and drive the internal camera 110 even when parked, not during travelling, to provide the user with image data which may provide evidence material at a time of an external impact.

As described above, the internal camera 110 is a built-in cam, and may include the impact detecting sensor 130 for detecting an internal impact. For example, the impact detecting sensor 130 may be a G-sensor included in a built-in cam, and the G-sensor may generate impact detection signals having different strengths based on the magnitude of an impact during travel or parking.

The internal camera 110 may provide the controller 160 with first image data including a front image and/or a rear image of the vehicle 1.

The external camera 120, which is a camera that photographs the surroundings of the vehicle 1, may generate a surround view monitoring (SVM) image. The SVM image may provide the user with various views according to various manipulations of the user.

The external camera 120 includes an external front camera 121 having a front field of view 121a, an external rear camera 122 having a rear field of view 122a, a left side camera 123 having a left field of view 123a of the vehicle 1, and a right side camera 124 having a right field of view 124a of the vehicle 1. The external front camera 121 and the external rear camera 122 may be provided on a grille or a bumper, and the left side camera 123 and the right side camera 124 may be provided on a side mirror or a B-pillar.

The external camera 120 may provide the controller 160 with second image data including a front image, a rear image, a left side image, and/or a right side image of the vehicle 1.

On the other hand, the internal camera 110 and the external camera 120 may be electrically connected to the controller 160, and thus, the controller 160 may transmit a control signal to the internal camera 110 and the external camera 120 while the vehicle 1 is stopped or parked. Furthermore, the internal camera 110 and the external camera 120 may be electrically connected to each other so that the external camera 120 may also receive power supplied from an auxiliary battery of the vehicle 1 to the internal camera 110. Accordingly, even when the vehicle 1 is in an ignition-off state and thus power is not supplied from a main battery, the external camera 120 may receive power and generate image data.

The internal camera 110 and the external camera 120 may include a plurality of lenses and an image sensor.

The impact detecting sensor 130 may be a G-sensor included in the built-in cam as described above, and generate an impact detection signal based on the magnitude of acceleration due to an impact or movement, and transmit the impact detection signal to the controller 160. Furthermore, the impact detecting sensor 130 may be an impact sensor built in an airbag system, and may have a fixed contact positioned in a moving direction with respect to a movable contact inside the impact detecting sensor, and may generate an impact detection signal based on a pressure level and transmit the generated impact detection signal to the controller 160.

The seating sensor 140 is built into a seat, and generates a seating signal by detecting the weight of a driver or passenger. In the instant case, the seating sensor 140 provides the generated seating signal to the controller 160.

The door sensor 150 is a module for detecting whether the door of the vehicle 1 is opened or closed, and generates a door signal upon detecting that the door is closed. The controller 160 may, upon receiving the door signal from the door sensor 150, determine that the door of the vehicle 1 is closed, and upon receiving no door signal, determine that the door is open.

The controller 160 may include an image signal processor, which is a processor 161 for processing image data of the cameras 110 and 120 and/or a micro control unit (MCU) for generating various control signals.

The memory 162 may store a program and/or data for processing image data and a program and/or data for the processor 161 to generate a control signal.

The memory 162 may temporarily memorize image data received from the internal camera 110 and/or the external camera 120, and temporarily memorize a result of the processing of the image data in the memory 162.

The memory 162 may be implemented as a non-volatile memory device, such as a cache, a read only memory (ROM), a programmable ROM (PROM), an erasable programmable ROM (EPROM), an electrically erasable programmable ROM (EEPROM), and a flash memory, or a volatile memory device, such as a random access memory (RAM), or a Hard Disk Drive (HDD), or a storage medium, such as a CD-ROM, but is not limited thereto.

Figure 3:
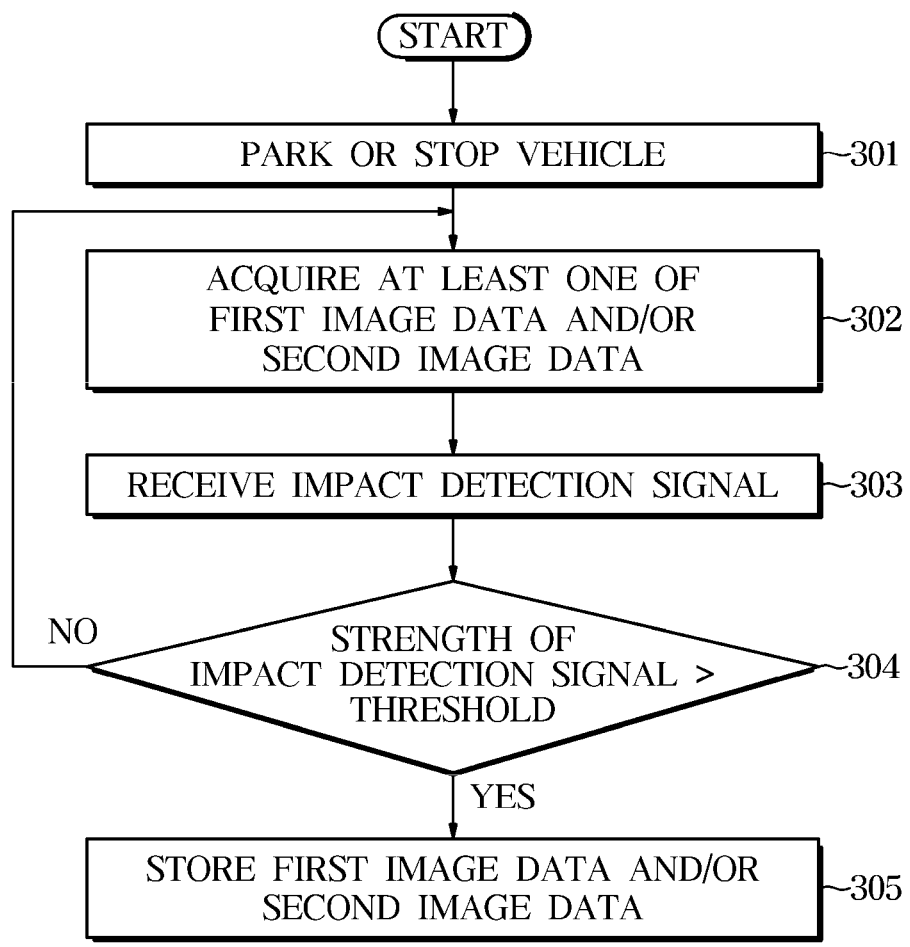
FIG. 3 is a flowchart showing a method of controlling a vehicle according to an exemplary embodiment of the present disclosure.

FIG. 3 is a flowchart showing a method of controlling a vehicle according to an exemplary embodiment of the present disclosure.

The controller 160 detects whether the vehicle 1 is parked or stopped (301). For example, the controller 160 may determine that the vehicle 1 is in a parked state or a stopped state when the power of the vehicle 1 is turned off or the position of the transmission is in the P stage. In the instant case, even when the power of the vehicle 1 is turned off, the internal camera 110 and the external camera 120 may be supplied with power.

The controller 160 obtains first image data and/or second image data (302). The controller 160 obtains the first image data through the internal camera 110 and obtains the second image data through the external camera 120.

The controller 160 receives an impact detection signal from the impact detecting sensor 130 (303). The controller 160 receives the magnitude of an acceleration of the gravity sensor (G sensor) or the magnitude of a pressure of the impact sensor, which corresponds to an impact detection signal.

The controller 160 may, upon receiving the impact detection signal, compare the strength of the impact detection signal with a threshold (304), and in response to the impact detection signal being greater than the threshold, generate an impact event. The impact event corresponds to a trigger that allows data storage and data transmission to be automatically performed in response to an external impact occurring.

The controller 160 may, in response to the strength of the impact detection signal being greater than the threshold, control the memory 162 to store the first image data and/or the second image data (305). In the instant case, the threshold is a value determined according to the type of the impact detecting sensor 130 and the generation signal, and may be determined in an initial manufacturing stage and according to a user's setting.

On the other hand, the exemplary embodiment according to FIG. 3 has described in relation to the overall process of automatically storing image data when an external impact occurs using the impact detecting sensor 130 which is already provided in the vehicle 1. The present disclosure is to efficiently utilize the already provided impact detecting sensor 130, and it is required to newly set a criterion for determining the impact detection signal generated by the impact detecting sensor 130. A detailed method thereof will be described in detail with reference to FIG. 4.

Figure 4:
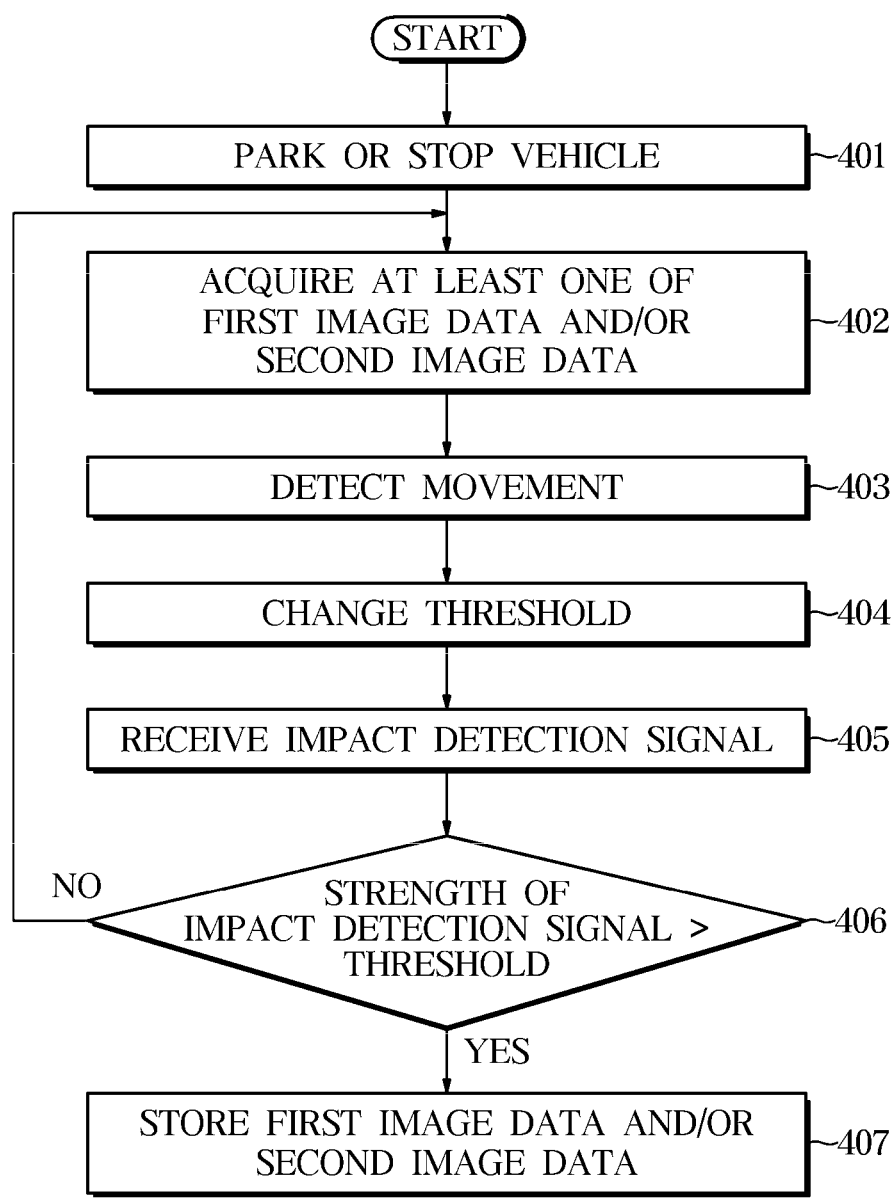
FIG. 4 is a flowchart showing a method of controlling a vehicle according to another exemplary embodiment of the present disclosure.
Figure 5:
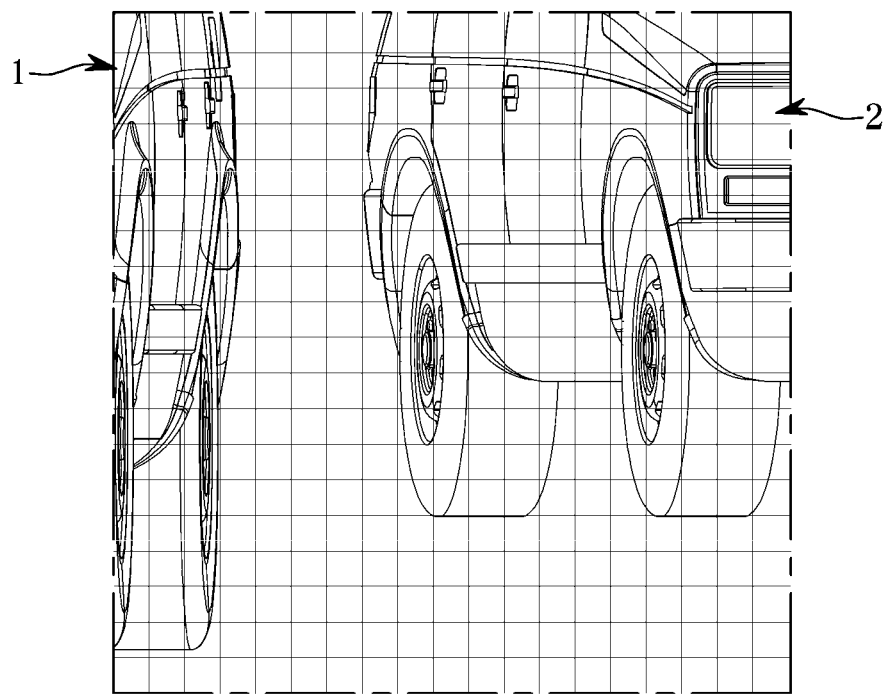
FIG. 5 and FIG. 6 are diagrams for describing an example in which a vehicle detects a movement of an object through an external camera, according to an exemplary embodiment of the present disclosure.
Figure 6:
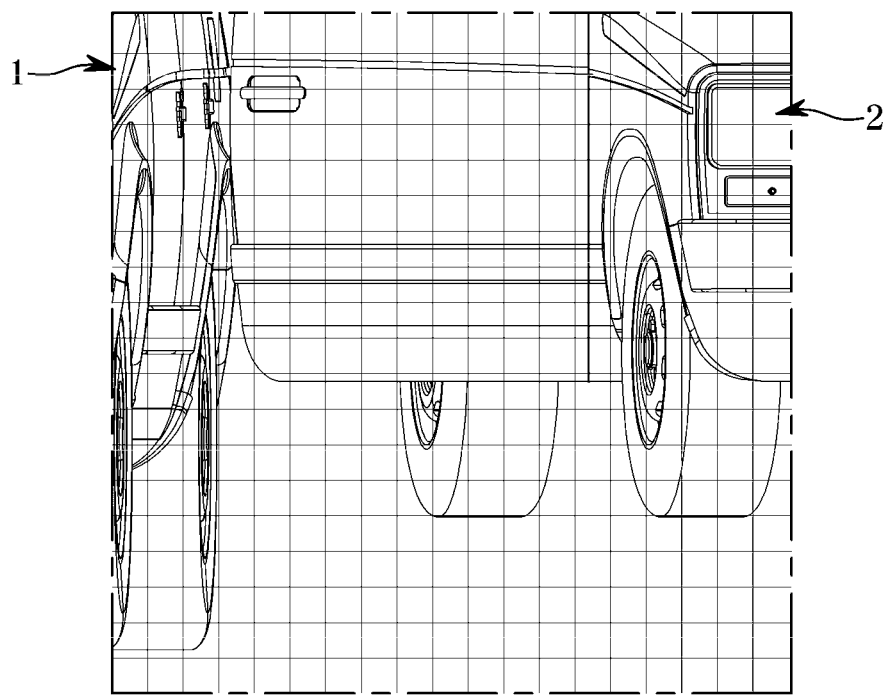

FIG. 4 is a flowchart showing a method of controlling a vehicle according to another exemplary embodiment of the present disclosure, and FIG. 5 and FIG. 6 are diagrams for describing an example in which a vehicle detects a movement of an object through an external camera, according to an exemplary embodiment of the present disclosure.

The controller 160 detects whether the vehicle 1 is parked or stopped (401). For example, the controller 160 may determine that the vehicle 1 is in a parked state or a stopped state when the power of the vehicle 1 is turned off or the position of the transmission is in the P stage. In the instant case, even when the power of the vehicle 1 is turned off, the internal camera 110 and the external camera 120 may be supplied with power.

The controller 160 obtains first image data and/or second image data (402). The controller 160 obtains the first image data through the internal camera 110 and obtains the second image data through the external camera 120.

The controller 160 processes the first image data and/or the second image data to detect the movement of an object (403). Here, the object is an element configured for giving an impact to the vehicle 1, and refers to another vehicle parked adjacent to the vehicle 1, or a moving object, such as a human or a bicycle approaching the vehicle 1.

The controller 160 processes the image data obtained through the internal camera 110 and/or the external camera 120 to detect the movement of the object. The controller 160 may detect the movement by converting an image extracted from image data into gray scales and comparing a preceding image with a following image at every predetermined time period.

The images shown in FIG. 5 and FIG. 6 represent a preceding image and a following image at a regular time interval, which are obtained through the external camera 120 provided in the side mirror of the vehicle 1. FIG. 5 illustrates a state in which the door of another vehicle parked next to the vehicle 1 is closed, and FIG. 6 illustrates a state in which the door of the other vehicle is opened after passage of a predetermined time period from the state shown in FIG. 5. The controller 160 may superimpose a preceding image and a following image to compare pixel data included in the image data, and in response to a difference occurring at a certain ratio or greater, determine that the movement of an object has occurred. The examples shown in FIG. 5 and FIG. 6 are only illustrative purpose only. For example, the controller 160 may determine the movement of an object based on the front image or the rear image of the internal camera 110.

Meanwhile, when the movement of an object is detected in operation 403, the controller 160 changes the threshold (404). The detection of a movement represent that an impact by an object is predicted to occur, and the controller 160 increases the sensitivity of the impact detecting sensor 140 to detect an impact smaller than an impact generated while travelling. In the instant case, the method of increasing the sensitivity is to lower the threshold, which is a criterion for comparing the strength of the impact detection signal.

The controller 160 receives an impact detection signal from the impact detecting sensor 130 (405).

The controller 160, upon receiving the impact detection signal, compares the strength of the impact detection signal with the changed threshold (406), and in response to the strength of the impact detection signal being greater than the changed threshold, generates an impact event.

The controller 160, in response to the strength of the impact detection signal being greater than the changed threshold, is configured to control the memory 162 to store the first image data and/or the second image data (407).

FIG. 7 is a flowchart showing a method of controlling a vehicle during parking according to an exemplary embodiment of the present disclosure, and FIG. 8 is a flowchart showing a method of controlling a vehicle according to an additional embodiment from FIG. 7.

The controller 160 detects whether the vehicle 1 is parked or stopped (701). For example, the controller 160 may determine that the vehicle 1 is in a parked state or a stopped state when the power of the vehicle 1 is turned off or the position of the transmission is in the P stage. In the instant case, even when the power of the vehicle 1 is turned off, the internal camera 110 and the external camera 120 may be supplied with power.

The controller 160 obtains first image data and/or second image data (702). The controller 160 obtains the first image data through the internal camera 110 and obtains the second image data through the external camera 120.

The controller 160, in response to no seating signal being detected (703) and a door signal being detected (704), detects the movement of an object, which is a condition for changing the threshold later (705). In the instant case, the controller 160, in response to a movement being detected based on the image data (the first image data and/or second image data) processed, changes the threshold (706). Furthermore, the controller 160 may omit the detecting of the movement of an object, and in response to no sitting signal being detected (703) and the door signal being detected (704), change the threshold (706).

In the instant case, the controller 160 increases the sensitivity to detect an impact smaller than an impact generated during travelling, in consideration of the vehicle being in a parking state. Similar to FIG. 4, the method of increasing the sensitivity is to lower the threshold, which is a criterion for comparing the strength of the impact detection signal.

The controller 160 receives an impact detection signal from the impact detecting sensor 130 (707).

The controller 160, upon receiving the impact detection signal, compares the strength of the impact detection signal with the changed threshold (708), and generates an impact event when the strength of the impact detection signal is greater than the changed threshold.

The controller 160, when the strength of the impact detection signal is greater than the changed threshold, is configured to control the memory 162 to store the first image data and/or the second image data (709).

Meanwhile, unlike the intermediate process in FIG. 7, even when a seating signal is detected or a door signal is not detected, the controller 160 detects whether the movement of an object occurs (801), and when the movement of the object is detected, change the threshold (802). Similarly, the controller 160 lowers the threshold to increase the sensitivity of the impact detecting sensor 140.

The exemplary embodiment of the present disclosure is a case in which a driver or passenger is in the vehicle 1 and having no need to store image data in response to factors other than an external impact. For example, there are indoor manipulation signals which may cause the impact detecting sensor 140 to generate an impact detection signal by a micro impact generated indoors, for example, signals based on an impact detection signal by an USB installation or USB removal, an impact detection signal by a touch using a lamp, an impact detection signal by a gear level manipulation, an impact detection signal by a steering wheel manipulation (multi-function steering wheel: MFSW), and other various user's manipulations.

For example, in the case of a door-ding impact, the strength of the impact detection signal generated by the gravity sensor (G sensor) is at a level of 0.3G or less, and in the case of a simple internal manipulation (a seat manipulation, a window manipulation, etc.) is at a level of 0.1G or less.

In the instant case, the controller 160 ignores the above-described indoor manipulation signal even when the threshold is lowered and the sensitivity of the impact detecting sensor 130 is increased (803). In the instant case, the controller 160 stores the strengths of different types of impact detection signal by the user manipulations in the memory 162, and upon detecting an impact detection signal having a strength corresponding thereto, determines that an indoor operation signal has occurred, and prevents image data based on the indoor operation signal from being stored.

The controller 160 receives the impact detection signal from the impact detecting sensor 130 (804).

The controller 160, upon receiving the impact detection signal, compares the strength of the impact detection signal with the changed threshold (805), and in response to the strength of the impact detection signal being greater than the changed threshold, generates an impact event.

The controller 160, when the strength of the impact detection signal is greater than the changed threshold, is configured to control the memory 162 to store the first image data and/or the second image data (806).

Meanwhile, although not shown in FIGS. 3, 4, 7 and 8 in the respective embodiments, the controller 160 may control the communicator 170 to transmit the stored image data (the first image data and/or second image data) to an external server or an external terminal. Furthermore, the controller 160 may control the communicator 170 to notify the user that the threshold is changed. Accordingly, the user may recognize in advance that an external impact may occur before the impact occurs. Furthermore, the controller 160 may control the communicator 170 to transmit the impact event to the external terminal to notify the user that an external impact has occurred.

Meanwhile, the disclosed exemplary embodiments of the present disclosure may be embodied in a form of a recording medium storing instructions executable by a computer. The instructions may be stored in a form of program code, and when executed by a processor, may generate a program module to perform the operations of the disclosed exemplary embodiments of the present disclosure. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, according to an aspect of the present disclosure, an external impact may be detected without additional equipment when the vehicle is parked or stopped, and damage occurred during parking or stopping may be easily proved with an improved performance of impact detection.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
an internal camera configured to obtain first image data;
an external camera configured to obtain second image data;
an impact detecting sensor configured to detect an external impact and generate an impact detection signal;
a seating sensor provided on a seat of the vehicle, and configured to detect whether a passenger sits on the seat and generate a seating signal;
a door sensor configured to detect whether a door of the vehicle is closed to generate a door signal;
a memory configured to store the first image data and the second image data; and a processor electrically connected to the impact detecting sensor and configured to generate an impact event when a strength of the impact detection signal exceeds a threshold, and in response to the impact event being generated, control the memory to store the first image data and the second image data in the memory, wherein the processor electrically connected to the seating sensor and the door sensor is further configured to, in response to the seating signal not being detected and the door signal being detected, change the threshold, and wherein the processor is further configured to:
process at least one of the first image data or the second image data to detect a movement occurring outside the vehicle;
in response to the movement being detected, lower the threshold; and
in response to the door signal being detected, process the at least one of the first image data or the second image data.

2. The vehicle of claim 1, further including:
a communicator configured to transmit and receive data to or from an external server or an external terminal,
wherein the processor is configured to, in response to the strength of the impact detection signal exceeding the threshold, control the communicator to transmit the first image data and the second image data to the external server or the external terminal.

3. The vehicle of claim 2, wherein the processor is further configured to control the communicator to transmit the impact event based on the changed threshold to the external terminal.

4. The vehicle of claim 1, wherein the processor is further configured to store the first image data and the second image data during a predetermined time interval from a point in time before the generation of the impact event to a point in time after the generation of the impact event.

5. The vehicle of claim 1, wherein the internal camera is provided inside the vehicle and includes a built-in cam for imaging a front view and a rear view for the vehicle.

6. The vehicle of claim 5, wherein the external camera is provided outside the vehicle and configured to generate a surround view monitoring (SVM) image for imaging a front view, a rear view, and a side view for the vehicle.

7. The vehicle of claim 6, wherein the processor is electrically connected to the internal camera and the external camera, and further configured to provide the internal camera and the external camera with a control signal while the vehicle is stopped or parked.

8. A method of controlling a vehicle, the method comprising:
obtaining first image data;
obtaining second image data;
detecting an external impact and generating an impact detection signal; and
when a strength of the impact detection signal exceeds a threshold, generating, by a processor, an impact event, and in response to the impact event being generated, controlling, by the processor, a memory to store the first image data and the second image data in the memory, wherein the method further includes:
detecting, by a seating sensor provided on a seat of the vehicle, whether a passenger sits on the seat and generate a seating signal; and
detecting, by a door sensor, whether a door of the vehicle is closed to generate a door signal,
in response to the seating signal not being detected and the door signal being detected, changing, by the processor, the threshold, and wherein the changing of the threshold includes:
processing at least one of the first image data or the second image data to detect a movement occurring outside the vehicle;
in response to the movement being detected, lowering the threshold; and
in response to the door signal being detected, processing, by the processor, the at least one of the first image data or the second image data.

9. The method of claim 8, further including:
transmitting and receiving data to or from an external server or an external terminal through a communicator; and
in response to the strength of the impact detection signal exceeding the threshold, controlling the communicator to transmit the first image data and the second image data to the external server or the external terminal.

10. The method of claim 9, further including controlling, by the processor, the communicator to transmit the impact event based on the changed threshold to the external terminal.

11. The method of claim 8, wherein the controlling of the memory to store the first image data and the second image data in the memory includes:
storing, by the processor, the first image data and the second image data during a predetermined time interval from a point in time before the generation of the impact event to a point in time after the generation of the impact event.

12. The method of claim 8, wherein the internal camera is provided inside the vehicle and includes a built-in cam for imaging a front view and a rear view for the vehicle.

13. The method of claim 12, wherein the external camera is provided outside the vehicle and configured to generate a surround view monitoring (SVM) image for imaging a front view, a rear view, and a side view for the vehicle.

14. The method of claim 13,
wherein the internal camera and the external camera are electrically connected to the processor for controlling the memory, and
wherein the method further includes providing, by the processor, the internal camera and the external camera with a control signal while the vehicle is stopped or parked.

* * * * *